United States Patent [19]

Takagi

[11] Patent Number: 5,440,191
[45] Date of Patent: Aug. 8, 1995

[54] ULTRASONIC MOTOR

[75] Inventor: Tadao Takagi, Yokohama, Japan

[73] Assignee: Nikon Corporation, Tokyo, Japan

[21] Appl. No.: 141,618

[22] Filed: Oct. 27, 1993

[30] Foreign Application Priority Data

Oct. 28, 1992 [JP] Japan .................................. 4-289164

[51] Int. Cl.6 ............................................. H02N 2/00
[52] U.S. Cl. ..................................................... 310/323
[58] Field of Search .......................................... 310/323

[56] References Cited

U.S. PATENT DOCUMENTS

| | | | |
|---|---|---|---|
| 4,510,411 | 4/1985 | Hakamata et al. | 310/316 |
| 4,692,650 | 9/1987 | Okumura et al. | 310/323 |
| 4,978,882 | 12/1990 | Kitani | 310/323 |
| 5,028,833 | 7/1991 | Kawai | 310/323 |
| 5,034,646 | 7/1991 | Shirasaki | 310/323 |
| 5,053,670 | 10/1991 | Kasugi | 310/323 |
| 5,066,884 | 11/1991 | Takagi et al. | 310/323 |
| 5,099,166 | 3/1992 | Hirano et al. | 310/323 |
| 5,148,075 | 9/1992 | Shirasaki | 310/323 |
| 5,150,000 | 9/1992 | Imasaka et al. | 310/323 |
| 5,164,629 | 11/1992 | Nakanishi | 310/323 |
| 5,204,577 | 4/1993 | Watanabe et al. | 310/323 |
| 5,327,040 | 7/1994 | Sumihara et al. | 310/323 |

Primary Examiner—Thomas M. Dougherty
Attorney, Agent, or Firm—Oliff & Berridge

[57] ABSTRACT

An ultrasonic motor is proposed for which the process of manufacture is easy and the yield and production cost are improved, in spite of the fact that the width of the contact between a moving member and a stator is less than the width of a base portion of the moving member.

This ultrasonic motor includes a stator in which traveling waves are excited by a piezoelectric element, and a moving member which is in pressure contact with the stator and which is driven by the traveling waves in the stator. The moving member includes a base portion and a slider portion which is provided on the side of the base portion facing the stator and which is formed with a contact surface against the stator. The contact surface is so formed that the width in the direction perpendicular to the direction of propagation of the traveling waves of the contact between the contact surface and the stator is substantially less than the width in that direction of the moving member base portion. The base portion and the slider portion of the moving member are formed as a unitary body from the same material, and preferably are formed as a unitary body from a composite resin material which includes potassium titanate whiskers.

10 Claims, 10 Drawing Sheets

ULTRASONIC MOTOR

BACKGROUND OF THE INVENTION

1. Field of the Invention

The present invention relates to an ultrasonic motor which employs ultrasonic waves for providing driving impulse.

2. Description of the Related Art

An ultrasonic motor which employs ultrasonic waves for providing driving impulse has been proposed, for example, in U.S. Pat. No. 5,204,577. The ultrasonic motor of this publication, as shown in FIG. 10 of the present application which is a partial cross section through a circularly symmetric structure, comprises a ring shaped stator assembly 1 comprising a elastic body 1a on the lower surface of which a piezoelectric element 1b is bonded, and a ring shaped rotor assembly 2 comprising a rotor base member 2a on the lower surface of which a ring shaped slider member 2b is bonded. The slider member 2b of the rotor assembly 2 is pressed into sliding contact against a ring shaped driving surface 1c of the elastic body 1a of the stator assembly 1 by a pressing force in the downward direction in the figure which is transmitted from a biasing means which is not shown to the rotor base member 2a via a flange portion 2c. The width a in the radial direction of the contact surface 2d of the slider member 2b against the driving surface 1c of the stator assembly 1 is made to be less than the total width b of the rotor base member 2a in the radial direction. By doing this, the rotational performance of the rotor assembly 2 is improved. A composite resin material such as polytetrafluorethylene in which glass fiber and molybdenum disulfide are mixed has been proposed as a material of which the slider member 2b may desirably be composed. A metallic material such as aluminum alloy or the like is generally used for the rotor base member 2a in order to suppress the damping of vibrations set up therein. The reference numeral 1d denotes a flange portion for supporting the stator assembly 1.

In the ultrasonic motor shown in FIG. 10, the slider member 2b is formed to be as thin as possible, in order to suppress the damping of vibrations set up in the rotor base member 2a. Because of this, and because the slider member 2b is formed with the width a in the radial direction of its contact surface 2d narrow, the process of manufacture of the slider member 2b and the process of bonding it to the rotor base member 2a become difficult, so that the yield of these manufacturing processes becomes low, and it is impossible to reduce the cost of manufacture of the ultrasonic motor.

SUMMARY OF THE INVENTION

The objective of the present invention is to provide an ultrasonic motor whose manufacture is easy and for which the yield of the manufacturing process is improved and the cost is reduced, in spite of and without any problem being caused by the fact that the width of the contact between a moving member and a stator is smaller than the width of the base portion of the moving member.

According to the present invention, there is proposed an ultrasonic motor, comprising a stator in which traveling waves are excited by a piezoelectric element, and a moving member which is in pressure contact with said stator and which is driven by said traveling waves in said stator, wherein: said moving member comprises a base portion and a slider portion which is provided on the side of said base portion facing said stator and which is formed with a contact surface against said stator, said contact surface is so formed that the width in the direction perpendicular to the direction of propagation of said traveling waves of the contact between said contact surface and said stator is substantially less than the width in said direction of said moving member base portion; and said moving member portion and said moving member slider portion are formed as a unitary body from a composite resin material which includes potassium titanate whiskers. Thereby, the above described objective is attained.

Since the moving member base portion and the moving member slider portion are formed as a unitary body, it is not necessary to perform any separate manufacturing operations to fabricate separately the moving member slider portion which is thin and narrow in width, or to fix it to the moving member base portion, and thereby the production yield for the ultrasonic motor is improved and the manufacturing cost is reduced.

For the material for the moving member base portion and the moving member slider portion, it is desirable to use a composite resin material which includes potassium titanate whiskers. In particular, it is desirable for this material for the moving member base portion and the moving member slider portion to include 40 wt % to 60 wt % thermoplastic resin, 15wt% to 30wt% potassium titanate whiskers, 15 wt % to 35 wt % carbon fibers, and 5 wt % to 15 wt % polytetrafluorethylene. When this type of composite resin material is employed, it is possible to form the moving member base portion and the moving member slider portion are formed as a unitary body by a molding process. If such a molding process is employed, it is further acceptable to form the contact surface of the moving member slider portion by a lapping process in order to make it more planer.

Included in the moving member, there may be provided a drive force transmission portion which outputs the driving force of the moving member base portion, and a vibration insulating portion which insulates against the transmission of vibration between the moving member base portion and the drive force transmission portion. According to the present invention, this moving member drive force transmission portion and this moving member vibration insulating portion may be formed as a unitary body together with the moving member base portion and the moving member slider portion. In such a case, the moving member vibration insulating portion may be formed as a thin plate. On the other hand, it is possible for this moving member drive force transmission portion and this moving member vibration insulating portion to be formed as separate members from the unitary moving member base portion and moving member slider portion. In such a case, the drive force transmission portion may be removably layered over the moving member base portion with the interposition of the vibration insulating portion, and, in this layered condition, may be engaged to the moving member base portion in the driving force direction of the moving member.

DETAILED DESCRIPTION OF THE PREFERRED EMBODIMENTS

Preferred Embodiment 1

Figure 10:
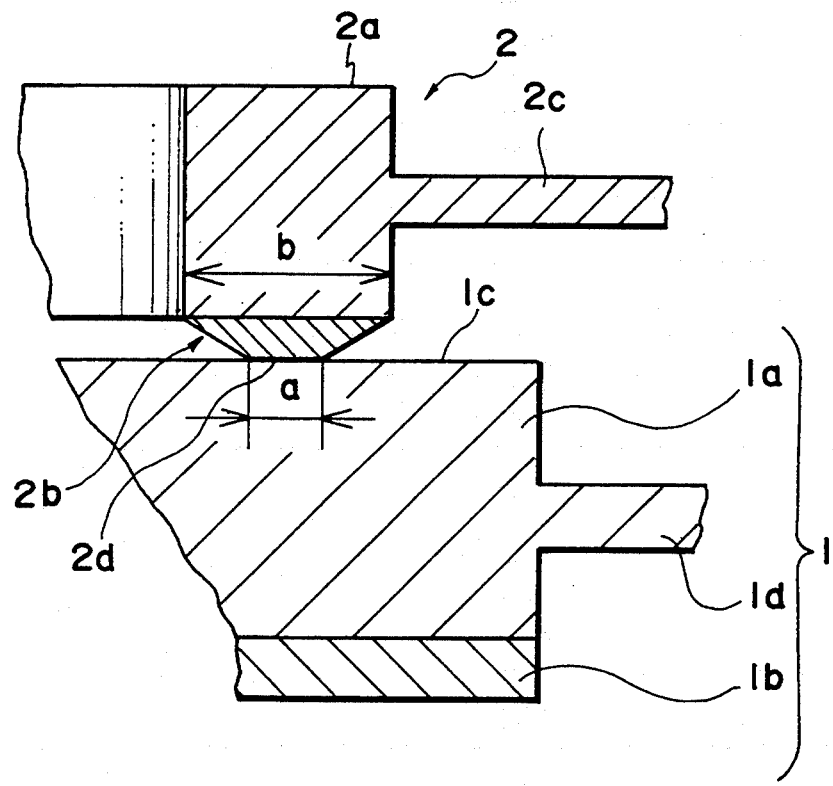
FIG. 10 is a partial cross sectional view taken in a plane similar to that of FIG. 1 for the first preferred embodiment, showing the mutually contacting portions of the stator and the rotor construction of an ultrasonic motor according to the prior art.

The first preferred embodiment of the ultrasonic motor of the present invention, which is a circularly symmetric rotary type motor, will now be explained with reference to FIGS. 1 through 3. In the following explanation and in the figures, parts which correspond to parts of the prior art ultrasonic motor of FIG. 10 described above and which have the same functions are denoted by the same reference numerals.

Figure 2:
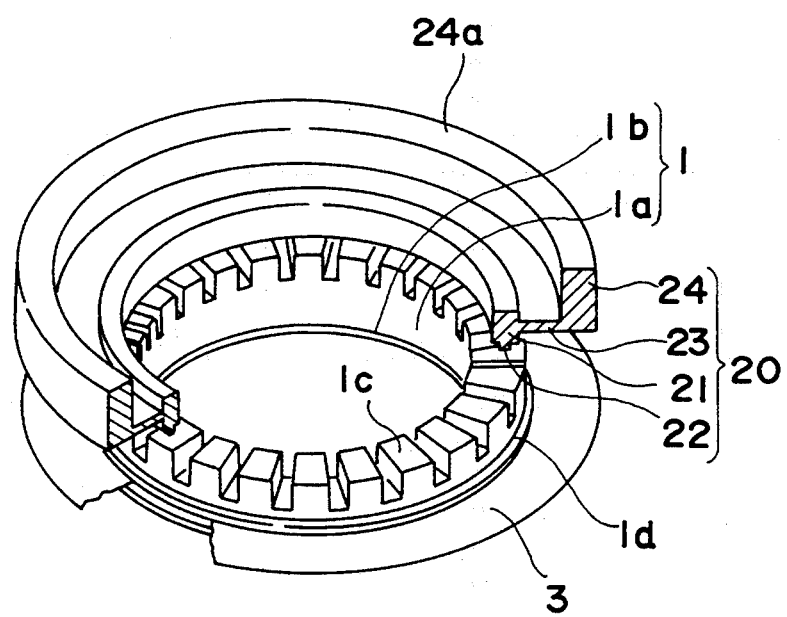
FIG. 2 is a perspective view showing the overall construction of this first preferred embodiment ultrasonic motor.

As shown in FIG. 2, the ultrasonic motor of this first preferred embodiment comprises a stator assembly 1 which comprises a ring shaped elastic body 1a on the under surface of which a ring shaped piezoelectric element 1b is bonded and whose upper surface in the figure is serrated and constitutes a driving surface 1c, and a ring shaped rotor construction 20 which is pressed into sliding contact against the driving surface 1c of the stator assembly 1 by a pressing force in the downward direction in the figure which is exerted by a biasing means which is not particularly shown. In a per se known manner, when appropriate actuating electrical energy is supplied to the piezoelectric element 1b of the stator assembly 1, the piezoelectric element 1b vibrates and excites vibration in the elastic body 1a, and traveling waves are thereby generated in the elastic body 1a which travel around its driving surface 1c in its circumferential direction. A description of the theory of the generation of these traveling waves can be found, for example, in U.S. Pat. No. 4,510,411, to which publication reference should be made if required; accordingly, the details thereof are omitted herein in the interests of brevity. A flange portion 1d of the stator assembly 1 is bonded to the upper surface of a ring shaped support member 3, and the stator assembly 1 is thereby supported by the support member 3. Phosphor bronze, stainless steel, or Invar are examples of suitable materials of which the elastic body 1a may be composed.

Figure 1:
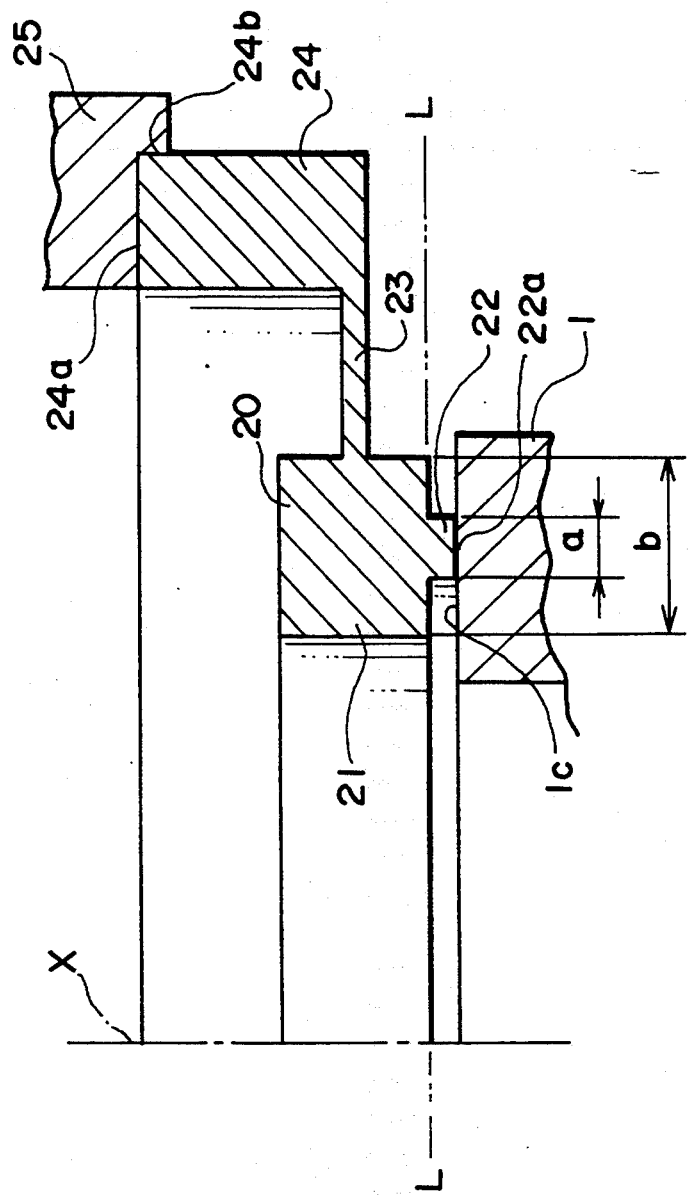
FIG. 1 is a partial cross sectional view showing the mutually contacting portions of the stator and the rotor construction of an ultrasonic motor which is the first preferred embodiment of the present invention, taken in a plane which includes the axis of symmetry of the ultrasonic motor.

As shown in FIGS. 1 and 2, the rotor construction 20, which is generally circularly symmetric, comprises a ring shaped rotor base portion 21 which is formed with a generally rectangular cross section, a ring shaped slider portion 22 which is formed with a generally rectangular cross section and which extends around and axially downward in the figure from the lower surface of the rotor base portion 21, a flange shaped vibration insulating portion 23 which is formed generally as a flat annular plate which projects in the outward radial direction from the outer circumferential surface of the rotor base portion 21 at an intermediate position thereof along the axial direction (same as the direction parallel to a rotor symmetric axis x), and a ring shaped drive force transmission portion 24 which is formed with a generally rectangular cross section and which extends in the axially upward direction in the figure from the outer periphery of the vibration insulating portion 23.

When traveling waves are generated as described above in the elastic body 1a of the stator assembly 1 and travel around its driving surface 1c in its circumferential direction, corresponding vibrations are also generated in the slider portion 22 of the rotor construction 2, and the slider portion 22 is thereby rotationally driven with respect to said elastic body 1a, and thereby the rotor construction 20 is impelled to rotate around its axis of symmetry x with a certain driving force. The thickness of the rotor base portion 21 in the axial direction is determined so as to maximize the driving efficiency of the ultrasonic motor. If the rotor base portion 21 is excessively thick in the axial direction then the vibrations set up therein will be excessively damped and its driving efficiency will deteriorate, while on the other hand if the rotor base portion 21 is excessively thin in the axial direction then there is a risk that vibrations in the opposite direction to the traveling waves traveling along the driving surface 1c of the stator assembly 1 will be transmitted to the rotor construction 20, so that the driving efficiency becomes bad. It has been found that with the ultrasonic motor shown in the FIGS. 1 and 2 the best driving efficiency is obtained when the thickness of the rotor base portion 21 in the axial direction is set to be about ½ of the amplitude of the vibrations set up in the driving surface 1c.

The slider portion 22 is of generally rectangular cross section, and, from its contact surface 22a with the driving surface 1c of the stator assembly 1 up to its boundary plane shown by the line L—L in FIG. 1 where it joins to the rotor base portion 21, its radial dimension as shown by "a" is substantially constant and is substantially less than the radial dimension as shown by "b" of the rotor base portion 21. By thus making the radial dimension of the slider portion 22 substantially less than the radial dimension of the rotor base portion 21, the sliding state of the rotor construction 20 on the stator assembly 1 is stabilized, and various parameters of rotational performance such as rotational irregularity of the rotor construction 20 and the low rotational speed controllability limit and so on are improved.

The vibration insulating portion 23 is formed so as to be quite thin in its axial dimension. By doing this the transmission of vibration from the rotor base portion 21 to the drive force transmission portion 24 is insulated, so that the damping of vibrations in the rotor base portion 21 is suppressed. The drive force transmission portion 24 is a portion for outputting to a force receiving member 25 the rotational force generated in the rotor construction 20 around its axis x, and its upper end surface 24a and a portion 24b of its outer circumferential surface are contacted against the force receiving member 25.

The rotor base portion 21, the slider portion 22, the vibration insulating portion 23, and the drive force transmission portion 24 are formed from the same material as a unitary body. This material for the rotor construction 20 should be suitably selected as required: for example, a composite material including a resin with potassium titanate whiskers dispersed therein and having desirable rotational characteristics may effectively be employed. With such a composite resin material being used as the material for the rotor construction 20, the rotor base portion 21, the slider portion 22, the vibration insulating portion 23, and the drive force transmission portion 24 are formed by molding together as a single unitary body, and thereby the manufacturing cost can be reduced.

Figure 3:
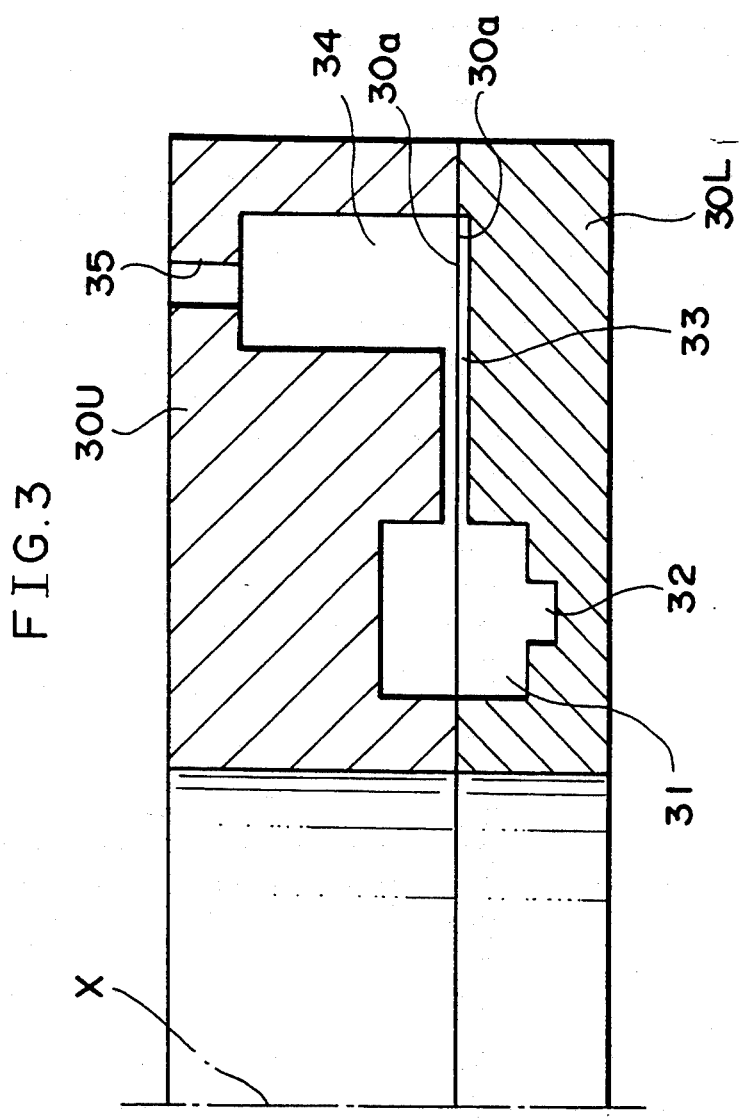
FIG. 3 is a partial cross sectional view of a mold suitable for use in the manufacture of the rotor construction of this first preferred embodiment.

The molding process may be performed, for example, by using a mold shown in FIG. 3. In this exemplary process, a separable mold is used which comprises an upper mold portion 30U and a lower mold portion 30L which meet along a parting surface 30a, and these two mold portions 30U and 30L are formed so as, when conjoined, to define cavities 31, 32, 33, and 34 which respectively correspond to the rotor base portion 21, the slider portion 22, the vibration insulating portion 23, and the drive force transmission portion 24. When the upper mold portion 30U and the lower mold portion 30L are thus conjoined, the composite resin material in the molten state is injected through an injection aperture 35 and is filled into the cavities 31, 32, 33, and 34. And, after the composite resin material has hardened, the formed rotor construction 20 is removed from this mold by splitting apart the upper mold portion 30U and the lower mold portion 30L. After formation of the rotor construction 20, it is desirable to lap the contact surface 22a of its slider portion 22 so as to make it more planar. It is desirable to reduce the flatness of the contact surface 22a of the slider portion 22 to less than the amplitude of the traveling waves set up in the stator assembly 1, and in practice this means that these deviations should be reduced to less than 1 $\mu$m.

The position of the parting surface 30a should not be considered as limited to the position shown in FIG. 3. And, of course, it would also be acceptable to form the rotor construction 20 by a process of machining or by a process of grinding instead of a molding process, or alternatively to form the rotor construction 20 from a material other than the above described composite resin material.

According to certain experiments which have been undertaken by the present inventor, a rotational performance which is not deteriorated in comparison with that of a prior art rotor assembly has been obtained, when the rotor construction 20 has been manufactured as described above as a unitary member using a composite resin material with weight percentages substantially as follows:

1) thermoplastic resin: 40% to 60%
2: potassium titanate whiskers: 15% to 30%
3: carbon fibers: 15% to 35%
4: polytetrafluorethylene: 5% to 15%

Preferred Embodiment 2

Figure 4:
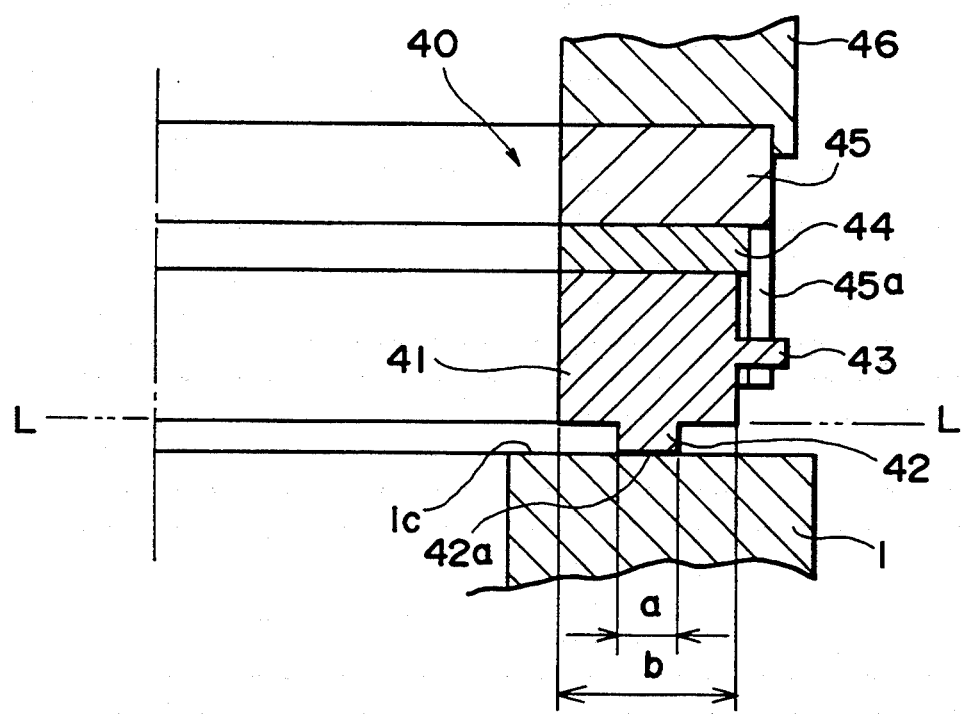
FIG. 4 is a partial cross sectional view taken in a plane similar to that of FIG. 1 for the first preferred embodiment, showing the mutually contacting portions of the stator and the rotor construction of an ultrasonic motor which is the second preferred embodiment of the present invention.
Figure 5A:
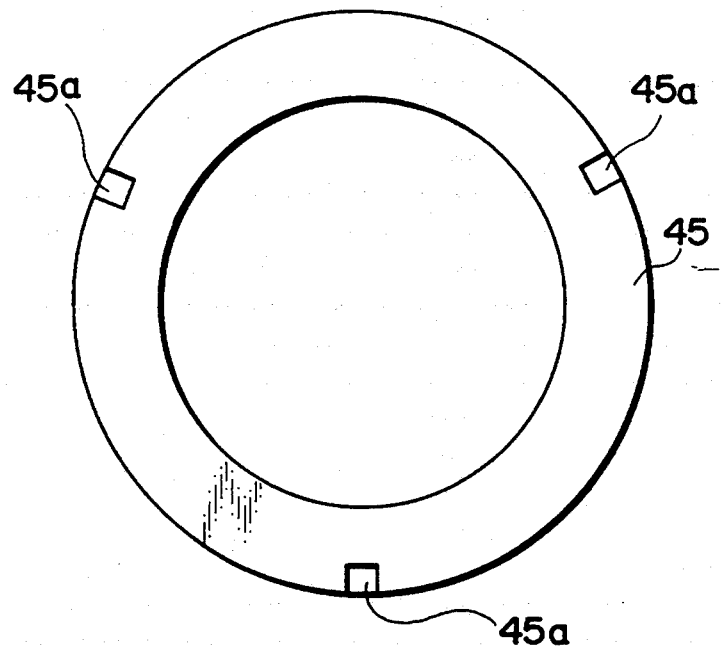
FIG. 5A is a view from below of a drive force transmission portion included in this second preferred embodiment.
Figure 5B:
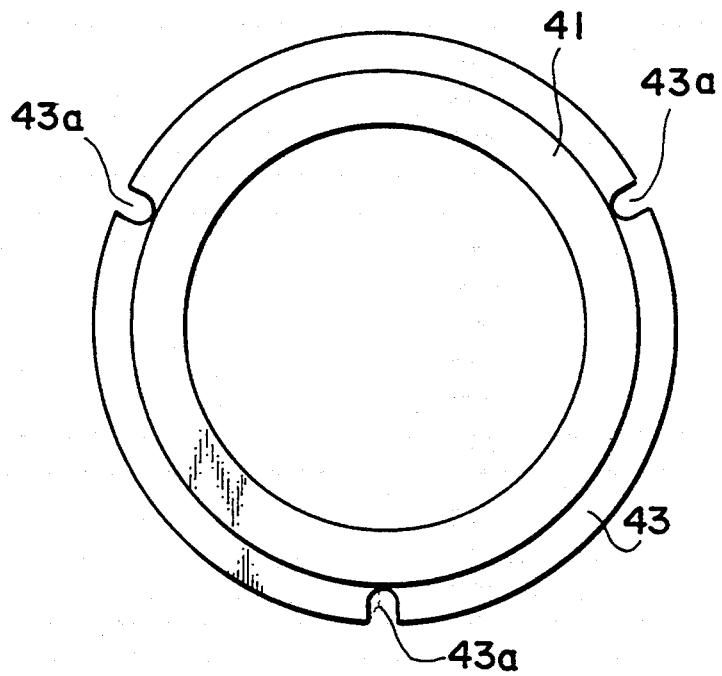
FIG. 5B is a plan view of a rotor base portion and a flange portion thereof included in this second preferred embodiment.

FIGS. 4 through 5B show the second preferred embodiment of the present invention, which again has been applied to a rotatory type of ultrasonic motor. In the following explanation and in these figures, parts which correspond to parts of the first preferred embodiment described above and which have the same functions are denoted by the same reference numerals.

As shown in FIG. 4, which like FIG. 1 shows a partial cross section through a circularly symmetric structure, the rotor construction 40 of this second preferred embodiment differs from that of the first preferred embodiment described above in that a vibration insulating portion 44 and a drive force transmission portion 45 are provided as separate portions from the rotor base portion 41. The rotor base portion 41 is formed in a generally ring shape, and a slider portion 42 is provided extending around and axially downward in the figure from the lower surface of the rotor base portion 41. And a flange portion 43 which is formed generally as a ring is provided so as to project in the outward radial direction from the outer edge of the rotor base portion 41 at a generally central position along the axial direction thereof.

The rotor base portion 41 vibrates together with the slider portion 42 due to traveling waves set up in the stator assembly 1. The slider portion 42 again is of generally rectangular cross section, and, from its contact surface 42a with the driving surface 1c of the stator assembly 1 up to its boundary plane shown by the line L—L in FIG. 4 where it joins to the rotor base portion 41, its radial dimension as shown by "a" is substantially constant and is substantially less than the radial dimension as shown by "b" of the rotor base portion 41. Therefore the sliding state of the rotor construction 40 on the stator assembly 1 is stabilized, and various parameters of rotational performance such as rotational irregularity of the rotor construction 40 and the low rotational speed controllability limit and so on are improved.

The rotor base portion 41, the slider portion 42, and the flange portion 43 are formed from the same material as a unitary body. As a material for this unitary body, there may effectively be employed, for example, the composite material of the first preferred embodiment including a resin with potassium titanate whiskers dispersed therein and having desirable rotational characteristics. And as a manufacturing process for this unitary body, molding process may advantageously be employed. It is desirable to lap the contact surface 42a of the slider portion 42 so as to make it more planar, after formation of the rotor construction 40.

A drive force transmission member 45 is laid over the rotor base portion 41 with a vibration insulating member 44 being interposed between them. This vibration insulating member 44 and drive force transmission member 45 are not fixed to the rotor base portion 41 with bolts or with adhesive or the like, but are only simply laid over it. The vibration insulating member 44 prevents vibration from being transmitted from the rotor base portion 41 to the drive force transmission member 45, and thereby ensures that the damping of vibrations in the rotor base portion 41 is suppressed. A material such as felt may be, for example, used as the material for the vibration insulating member 44. As shown in FIGS. 5A and 5B, three engagement projections 45a are formed as extending in the axial direction of the ultrasonic motor from the outer periphery of the drive force transmission member 45, and three cutaway portions 43a are formed in the flange portion 43 of the rotor base portion 41. By engagement of these three engagement projections 45a with these three cutaway portions 43a, the rotational force of the rotor base portion 41 is transmitted to the drive force transmission member 45. This rotational force which has been transmitted to the drive force transmission member 45 is thence transmitted to a force receiving member 46, against which the upper end surface and a portion of the outer circumferential surface of the drive force transmission member 45 are contacted. Moreover, in a variant embodiment, it would also be effective for the drive force transmission member 45 and the force receiving member 46 to be formed integrally as one body.

According to this second preferred embodiment of the present invention, the material for the vibration insulating member 44 and the drive force transmission member 45 is not constrained to be the same as the material for the rotor base portion 41, the slider portion 42, and the flange portion 43, so that the material for the vibration insulating member 44 and the drive force transmission member 45 can be freely selected according to mechanical requirements.

Although in the above described first and second preferred embodiments of the present invention the slider portions 22 and 42 were formed of constant radial dimension as shown by "a" from their contact surfaces with the driving surfaces of their stator assemblies up to their boundary planes where they joined to their rotor base portions, this is not to be considered as limitative of the present invention. Several variants of the slider portion for several variant embodiments are shown in FIGS. 6 through 9B, and will now be explained. In these figures and in the following explanation, parts which correspond to parts of the first and second preferred embodiments described above and which have the same functions are denoted by the same reference numerals.

Figure 6:
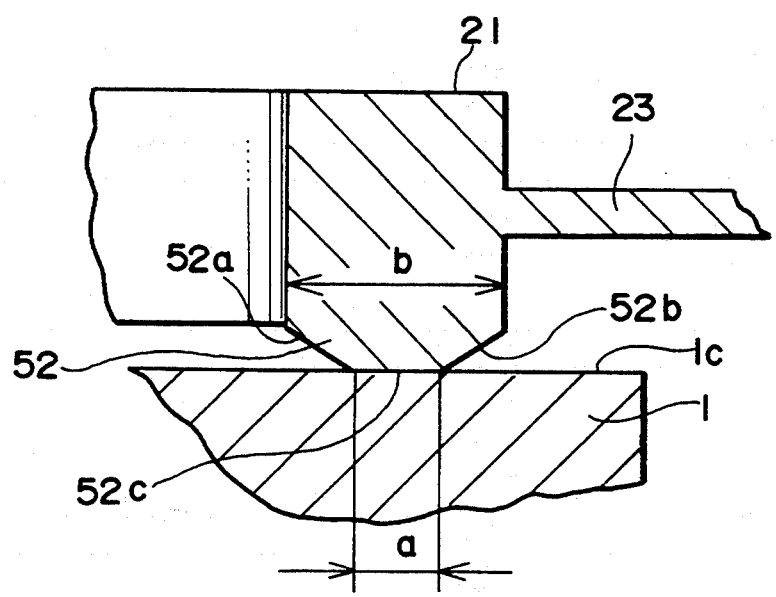
FIG. 6 is a partial cross sectional view taken in a plane similar to that of FIG. 1 for the first preferred embodiment, showing the mutually contacting portions of the stator and the rotor construction of an ultrasonic motor which is a first variant embodiment of the present invention.

With the variant embodiment shown in FIG. 6, the slider portion 52 is formed in cross section as a trapezium, not as a rectangle. In other words, the lower surface of the slider portion 52 comprises a sloping inner ring wall 52a, a sloping outer ring wall 52b, and a contact surface 52c with the driving surface 1c of the stator assembly 1 which is of radial dimension as shown by "a" which is substantially less than the radial dimension as shown by "b" of the rotor base portion 21. The rotor base portion 21 and the slider portion 52 with its sloping inner and outer ring walls 52a and 52b can be formed together by the molding process from the same material as a unitary body, and in the case of this variant embodiment no lapping process is required for the sloping inner and outer ring walls 52a and 52b. It would be acceptable to form the sloping inner and outer ring walls 52a and 52b by a process of machining or by a process of grinding.

Figure 7A:
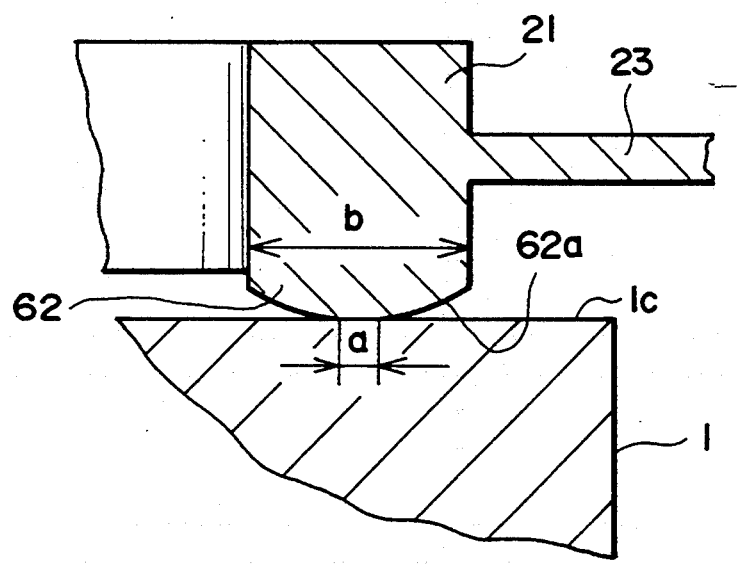
FIG. 7A is a partial cross sectional view taken in a plane similar to that of FIG. 1 for the first preferred embodiment, showing the mutually contacting portions of the stator and the rotor construction of an ultrasonic motor which is a second variant embodiment of the present invention.
Figure 7B:
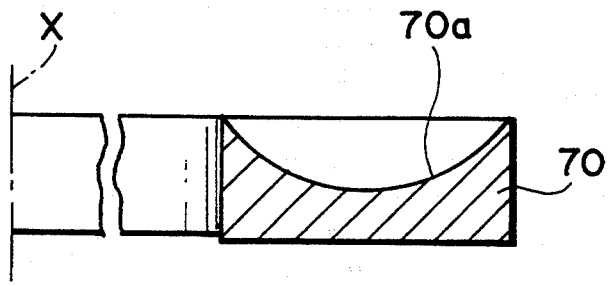
FIG. 7B is a partial cross sectional view of a lapping tool used for forming the contact portion of the rotor construction shown in FIG. 7A.

With the variant embodiment shown in FIG. 7A, the lower surface 62a of the slider portion 62 is formed in cross section as a convex circular arc, and in use the portion thereof which constitutes the actual contact surface with the driving surface 1c of the stator assembly 1 is slightly deformed by pressure against the driving surface 1c so that it comes to be of radial dimension as shown by "a" which is substantially less than the radial dimension as shown by "b" of the rotor base portion 21. This convex lower surface 62a of the slider portion 62 may be formed using a lapping tool 70, as for example shown in FIG. 7B, which is provided with a lapping face 70a formed in cross section as a concave circular arc which makes a complementary shape with the desired final convex circular arc form for the lower surface 62a. The lapping face 70a of the lapping tool 70 and the lower surface of the slider portion 62 of the rotor base portion 21 (as initially rough shaped by molding or the like) are pressed together, and then the rotor base portion 21 and the lapping tool 70 are rotated with respect to one another around the axis of symmetry of the rotor base portion 21, so as to produce the final shape for the lower surface 62a of the slider portion 62 by a lapping process.

Figure 8A:
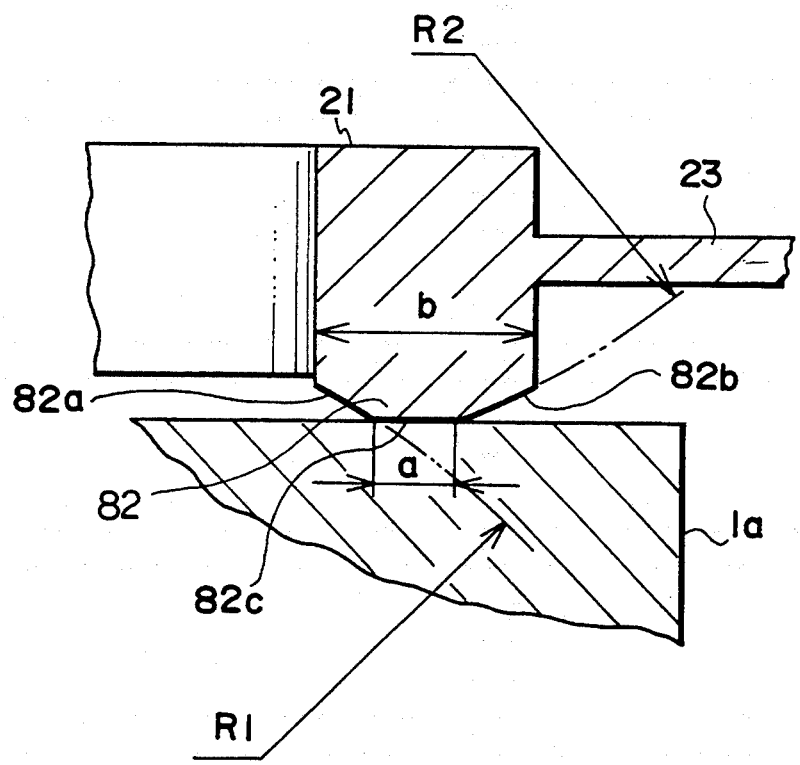
FIG. 8A is a partial cross sectional view taken in a plane similar to that of FIG. 1 for the first preferred embodiment, showing the mutually contacting portions of the stator and the rotor construction of an ultrasonic motor which is a third variant embodiment of the present invention.
Figure 8B:
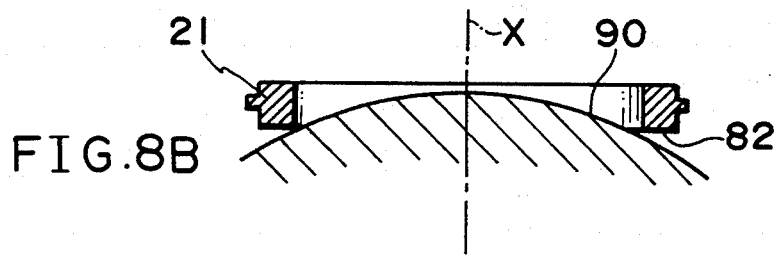
FIG. 8B is a cross sectional view showing a lapping tool being used for forming a first part of the contact portion of the rotor construction shown in FIG. 8A.
Figure 8C:
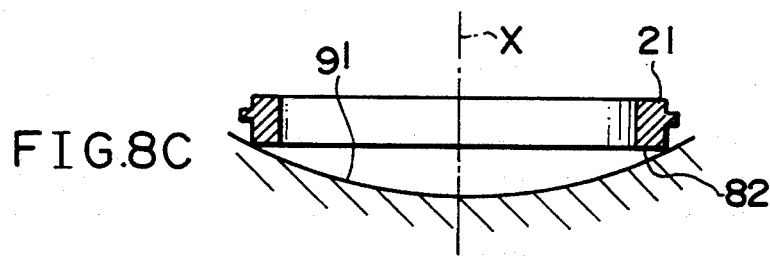
FIG. 8C is a cross sectional view showing another lapping tool being used for forming a second part of the contact portion of the rotor construction shown in FIG. 8A.

With the variant example shown in FIG. 8A, the lower surface of the slider portion 82 comprises a sloping inner ring wall 82a, a sloping outer ring wall 82b, and a substantially planar ring shaped contact surface 82c with the driving surface 1c of the stator assembly 1. In detail, the inner ring wall 82a of the slider portion 82 is formed as a ring shaped portion of the surface of a concave sphere of radius R1, while its outer ring wall 82b is formed as a ring shaped portion of the surface of a convex sphere of lower surface 62a. The inner ring wall 82a may be formed using a convex spherical lapping tool 90 of radius R1, as for example shown in FIG. 8B, which makes a complementary shape with the desired final concave spherical form for the inner ring wall 82a. The lapping face of the lapping tool 90 and the inner edge of the slider portion 82 of the rotor base portion 21 (as initially rough shaped by molding or the like) are pressed together, and then the rotor base portion 21 and the lapping tool 90 are rotated with respect to one another around the axis of symmetry of the rotor base portion 21, so as to produce the final concave spherical shape for the inner ring wall 82a of the slider portion 82 by a lapping process. Similarly, the outer ring wall 82b may be formed using a concave spherical lapping tool 91 of radius R2, as for example shown in FIG. 8C, which makes a complementary shape with the desired final convex spherical form for said outer ring wall 82b. The lapping face of the lapping tool 91 and the outer edge of the slider portion 82 of the rotor base portion 21 (as initially rough shaped by molding or the like) are pressed together, and then the rotor base portion 21 and the lapping tool 91 are rotated with respect to one another around the axis of symmetry of the rotor base portion 21, so as to produce the final convex spherical shape for the outer ring wall 82b of the slider portion 82 by a lapping process. By doing this, the ring shaped contact surface 82c of the slider portion 82 with the driving surface 1c of the stator assembly 1 is formed to be of radial dimension as shown by "a" which is substantially less than the radial dimension as shown by "b" of the rotor base portion 21.

Figure 9A:
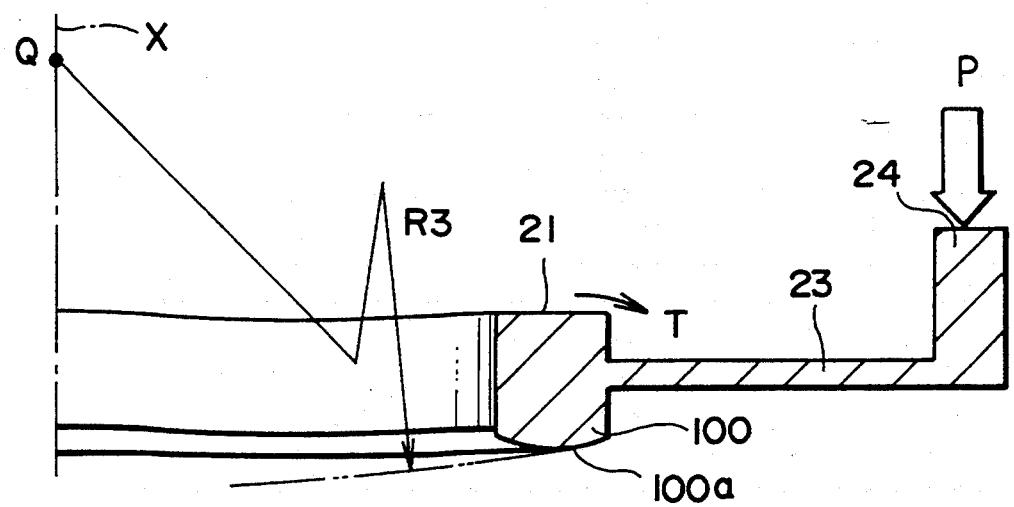
FIG. 9A is a partial cross sectional view taken in a plane similar to that of FIG. 1 for the first preferred embodiment, showing the mutually contacting portions of the stator and the rotor construction of an ultrasonic motor which is a fourth variant embodiment of the present invention.
Figure 9B:
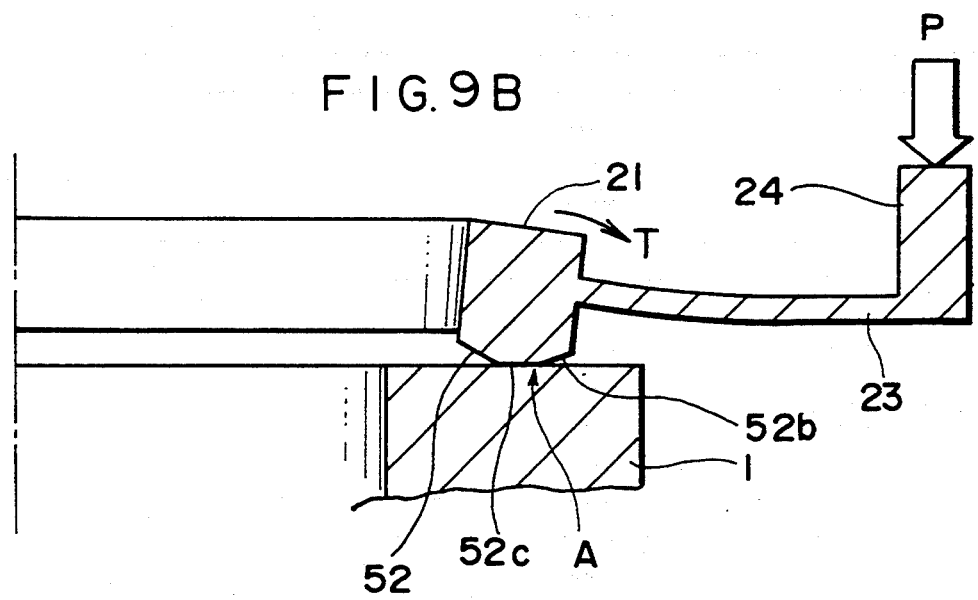
FIG. 9B is a partial cross sectional view taken in a plane similar to that of FIG. 1 for the first preferred embodiment, showing how the rotor construction of the first variant embodiment shown in FIG. 6, when subjected to distorting force, does not perform as well as does the rotor construction of the fourth preferred embodiment shown in FIG. 9A.

With the variant embodiment shown in FIG. 9A, the external circumferential edge of the ring shaped contact surface 100a of the slider portion 100 is formed into a spherical shape by rotating the rotor construction in a lapping tool (not particularly shown) having a concave spherical surface with a radius of R3 around a point Q on the central axis of the rotor construction taken as a center, and thereby the contact surface of the ring shaped contact surface 100a of the slider portion 100 with the driving surface 1c of the stator assembly 1 comes to be of radial dimension as shown by "a" which is substantially less than the radial dimension as shown by "b" of the rotor base portion 21. In this variant embodiment, even if a pressing force in the direction of the stator assembly 1 is applied as shown by the arrow "P" in the figure to a point on the drive force transmission portion 24 and is thence transmitted via the vibration insulating portion 23 to the rotor base portion 21 so that as shown by the arrow "T" in the figure the rotor base portion 21 is locally twisted about its circumferential direction, nevertheless good contact is assured to be maintained between the ring shaped contact surface 100a of the slider portion 100 and the driving surface 1c of the stator assembly 1, because the contact surface 100a is formed in a convex spherical shape. As a result, rotational irregularities and variations of rotational speed caused by alterations in the contact condition between the rotor construction and the stator assembly do not occur. By contrast, with the slider portion 52 of the variant embodiment shown in FIG. 6, if as shown in FIG. 9B a pressing force in the direction of the stator assembly 1 is applied as shown by the arrow "P" in the figure so that in the same manner as above the rotor base portion 21 is locally twisted about its circumferential direction as shown by the arrow "T" in the figure, the edge denoted by "A" of the slider portion 52 locally becomes the sole portion of the slider portion 52 in contact with the driving surface 1c of the stator assembly 1. Therefore the contact between the slider portion 52 and the stator assembly 1 has changed from an area contact to a line contact, so that there is a danger of deterioration of the rotational performance.

In the above described preferred embodiments and variant embodiments the slider portion was approximately symmetrical left and right in cross section, but it would also be acceptable for this form to be varied, provided that the condition is maintained that the contact surface of the slider portion with the driving surface of the stator assembly is of radial dimension substantially less than the radial dimension of the rotor base portion. For example, it would be acceptable for the slider portion 52 of FIG. 6 to be formed with only one of the sloping inner and outer ring walls 52a and 52b, i.e. with either one by itself.

Further, the above embodiments have shown the present invention as applied to a cylindrical type rotary ultrasonic motor, but it should be understood that the present invention is not to be considered as limited to this form, and can also be applied to, for example, a disk plate type rotary ultrasonic motor. Yet further, the present invention is not to be considered as being limited in its application to a rotary type ultrasonic motor, but can also be applied to, for example, a linear type ultrasonic motor. In this case, while setting the width of a moving member base portion in the direction perpendicular to the direction of progression of the traveling waves to be relatively large in order to enhance the driving efficiency, the width of the contact between the moving member and the stator assembly can be arranged to be relatively small, so as to suppress the irregular motion of the moving member and associated changes of control characteristic due to unequal contacting. Other variations of the details of any particular embodiment of the present invention are possible without departing from its scope. Accordingly, although the present invention has been shown and described in terms of several preferred embodiments thereof, it is not to be considered as limited by any of the perhaps quite fortuitous details of said embodiments or of the drawings, but only by the terms of the appended claims, which follow.

I claim:

1. An ultrasonic motor comprising;
a stator in which traveling waves are excited by a piezoelectric element, and
a moving member which is in pressure contact with said stator and which is driven by said traveling waves in said stator, wherein:
said moving member comprises a base portion and a slider portion provided on the side of said base portion facing said stator and formed with a contact surface against said stator,
said contact surface is so formed that the width in the transverse direction perpendicular to the direction of propagation of said traveling waves of the contact between said contact surface and said stator is substantially less than the width in said transverse direction of said moving member base portion,
said moving member base portion and said moving member slider portion are formed as a one-piece, molded unitary body by a molding process using a composite resin material,
said composite resin material includes 40 wt % to 60 wt % thermoplastic resin, 15 wt % to 30 wt % potassium titanate whiskers, 15 wt % to 35 wt % carbon fibers, and 5 wt % to 15 wt % polytetrafluorethylene.

2. An ultrasonic motor comprising;
a stator in which traveling waves are excited by a piezoelectric element, and a moving member which is in pressure contact with said stator and which is driven by said traveling waves in said stator, wherein:

said moving member comprises a base portion, a slider portion which is provided on the side of said base portion facing said stator and which is formed with a contact surface against said stator, a drive force transmission portion which outputs driving force, and a vibration insulating portion which insulates against the transmission of vibration between said moving member base portion and said drive force transmission portion;

said contact surface is so formed that the width in the transverse direction perpendicular to the direction of propagation of said traveling waves of the contact between said contact surface and said stator is substantially less than the width in said transverse direction of said moving member base portion; and said moving member base portion and said moving member slider portion, said moving member drive force transmission portion, and said moving member vibration insulating portion are formed as a one-piece, molded unitary body by a molding process using a composite resin material which includes potassium titanate whiskers.

3. An ultrasonic motor according to claim 2, wherein said vibration insulating portion is formed as a thin plate.

4. An ultrasonic motor according to claim 2, wherein the material for said moving member base portion, said moving member slider portion, said moving member drive force transmission portion, and said moving member vibration insulating portion includes 40 wt % to 60 wt % thermoplastic resin, 15 wt % to 30 wt % potassium titanate whiskers, 15 wt % to 35 wt % carbon fibers, and 5 wt % to 15 wt % polytetrafluorethylene.

5. An ultrasonic motor according to claim 2, wherein said moving member base portion, said moving member slider portion, said moving member drive force transmission portion, and said moving member vibration insulating portion are formed as a unitary body by a molding process; and, said contact surface of said moving member slider portion is formed by a lapping process.

6. An ultrasonic motor comprising;

a stator in which traveling waves are excited by a piezoelectric element, and a moving member which is in pressure contact with said stator and which is driven by said traveling waves in said stator, wherein:

said moving member comprises a base portion, a slider portion which is provided on the side of said base portion facing said stator and which is formed with a contact surface against said stator, a drive force transmission portion which outputs driving force, and a vibration insulating portion which insulates against the transmission of vibration between said moving member base portion and said drive force transmission portion;

said contact surface is so formed that the width in the transverse direction perpendicular to the direction of propagation of said traveling waves of the contact between said contact surface and said stator is substantially less than the width in said transverse direction of said moving member base portion;

said moving member base portion and said moving member slider portion are formed as a unitary body from the same material; and said drive force transmission portion is removably layered over said moving member base portion with the interposition of said vibration insulating portion, and in this layered condition is engaged to said moving member base portion in the driving force direction of said moving member.

7. An ultrasonic motor according to claim 6, wherein the material for said moving member base portion and said moving member slider portion is a composite resin material which includes potassium titanate whiskers.

8. An ultrasonic motor according to claim 6, wherein the material for said moving member base portion and said moving member slider portion includes 40 wt % to 60 wt % thermoplastic resin, 15 wt % to 30 wt % potassium titanate whiskers, 15 wt % to 35 wt % carbon fibers, and 5 wt % to 15 wt % polytetrafluorethylene.

9. An ultrasonic motor according to claim 7, wherein said moving member base portion and said moving member slider portion are formed as a unitary body by a molding process.

10. An ultrasonic motor according to claim 9, wherein said contact surface of said moving member slider portion is formed by a lapping process.

* * * * *